(12) United States Patent
Tomioka et al.

(10) Patent No.: US 9,886,052 B2
(45) Date of Patent: Feb. 6, 2018

(54) VOLTAGE REGULATOR

(71) Applicant: SII Semiconductor Corporation, Chiba-shi, Chiba (JP)

(72) Inventors: Tsutomu Tomioka, Chiba (JP); Masakazu Sugiura, Chiba (JP)

(73) Assignee: SII SEMICONDUCTOR CORPORATION, Chiba (JP)

(*) Notice: Subject to any disclaimer, the term of this patent is extended or adjusted under 35 U.S.C. 154(b) by 0 days.

(21) Appl. No.: 15/156,828

(22) Filed: May 17, 2016

(65) Prior Publication Data
US 2016/0342171 A1 Nov. 24, 2016

(30) Foreign Application Priority Data

May 21, 2015 (JP) .................................. 2015-103910

(51) Int. Cl.
*H02M 3/156* (2006.01)
*G05F 3/24* (2006.01)
*G05F 3/26* (2006.01)

(52) U.S. Cl.
CPC ................ *G05F 3/24* (2013.01); *G05F 3/262* (2013.01); *H02M 3/156* (2013.01)

(58) Field of Classification Search
None
See application file for complete search history.

(56) References Cited

U.S. PATENT DOCUMENTS

| 5,828,206 A * | 10/1998 | Hosono | G05F 1/569 323/273 |
| 6,369,561 B1 * | 4/2002 | Pappalardo | H02J 7/0052 323/284 |
| 8,289,009 B1 * | 10/2012 | Strik | G05F 1/575 323/272 |
| 2005/0088159 A1 * | 4/2005 | Itohara | H02M 3/156 323/284 |
| 2012/0161734 A1 * | 6/2012 | Wu | G05F 1/575 323/282 |
| 2014/0266105 A1 * | 9/2014 | Li | G05F 1/565 323/280 |

FOREIGN PATENT DOCUMENTS

JP 2001-022455 A 1/2001

* cited by examiner

*Primary Examiner* — Jeffrey Gblende
(74) *Attorney, Agent, or Firm* — Brinks Gilson & Lione

(57) ABSTRACT

Provided is a voltage regulator configured to suppress a fluctuation in output voltage even when a power supply voltage fluctuates, thereby realizing stable operation thereof. The voltage regulator includes a control circuit including a first input terminal connected to a drain of an output transistor, a second input terminal connected to a power supply terminal, an overshoot detection circuit connected to the first input terminal, and a power supply voltage detection circuit connected to the second input terminal, and being configured to cause a boost current to flow through an error amplifier circuit when an output voltage and a power supply voltage largely fluctuate with respect to a predetermined voltage.

5 Claims, 3 Drawing Sheets

US 9,886,052 B2

VOLTAGE REGULATOR

RELATED APPLICATIONS

This application claims priority under 35 U.S.C. § 119 to Japanese Patent Application No. 2015-103910 filed on May 21, 2015, the entire content of which is hereby incorporated by reference.

BACKGROUND OF THE INVENTION

1. Field of the Invention

The present invention relates to a voltage regulator capable of suppressing a fluctuation in output voltage even when a power supply fluctuates.

2. Description of the Related Art

A related-art voltage regulator is described. FIG. 3 is a circuit diagram for illustrating the related-art voltage regulator.

The related-art voltage regulator includes PMOS transistors 106, 107, 108, 301, 302, and 303, NMOS transistors 103, 104, 105, 304, 305, 306, 307, and 308, resistors 109, 110, and 309, a capacitor 310, a ground terminal 100, a power supply terminal 101, and an output terminal 102.

The PMOS transistors 301, 302, and 303, the NMOS transistors 305, 306, and 308, and the resistor 309 form a bias circuit. The NMOS transistors 304 and 307 and the capacitor 310 form a control circuit. The PMOS transistors 106 and 107 and the NMOS transistors 103, 104, and 105 form an error amplifier circuit. The PMOS transistor 108 and the resistors 109 and 110 form an output circuit.

When power is supplied to the voltage regulator, a substantially uniform voltage is applied across both ends of the capacitor 310. Then, a gate voltage of the NMOS transistor 304 is raised to a power supply voltage VDD, thereby turning on the NMOS transistor 304, with the result that a gate voltage of the PMOS transistor 303 is decreased to a ground voltage. Thus, the PMOS transistor 303 is turned on to increase a gate voltage of the NMOS transistor 103. As a result, a current flowing through the NMOS transistor 103 is increased, and hence an operating speed of the error amplifier circuit is temporarily increased. In this way, overshoot and undershoot, which may occur due to a low operating speed of the error amplifier circuit, are prevented, thereby being capable of preventing adverse effects on a circuit connected downstream of the output terminal 102.

Then, as the capacitor 310 is charged, the gate voltage of the NMOS transistor 304 is decreased. When the gate voltage is decreased to be a threshold Vth or less, the NMOS transistor 304 is turned off. Thus, the entire operation of the control circuit is stopped. At this time, the power supply voltage VDD is in a steady state, and hence the voltage regulator normally operates.

After that, if the power supply voltage VDD suddenly changes, the following operation is performed to prevent overshoot and undershoot as in the case described above. Specifically, when the power supply voltage VDD is first decreased, charges of the capacitor 310 are discharged, and when the power supply voltage VDD is next increased, an operating current of the error amplifier circuit is increased through operation similar to that described above (for example, see Japanese Patent Application Laid-open No. 2001-22455).

However, the related-art voltage regulator has the following problems. One problem is that the gate voltage of the PMOS transistor 303 varies even when the power supply voltage VDD slightly fluctuates, and hence a tail current of the error amplifier circuit is frequently changed to change an operating point of the error amplifier circuit, with the result that the operation of the voltage regulator is unstable. Another problem is that when the power supply voltage VDD largely fluctuates, a current of the PMOS transistor 303 is unlimitedly increased to excessively increase the tail current of the error amplifier circuit, with the result that the operation of the voltage regulator is unstable.

SUMMARY OF THE INVENTION

The present invention has been made in view of the above-mentioned problems, and provides a voltage regulator configured to suppress a fluctuation in output voltage even when a power supply voltage fluctuates, thereby realizing stable operation thereof.

In order to solve the related-art problems, a voltage regulator according to one embodiment of the present invention has the following configuration.

The voltage regulator includes a control circuit including a first input terminal connected to a drain of an output transistor, a second input terminal connected to a power supply terminal, an overshoot detection circuit connected to the first input terminal, and a power supply voltage detection circuit connected to the second input terminal, and being configured to cause a boost current to flow through an error amplifier circuit when an output voltage and a power supply voltage largely fluctuate with respect to a predetermined voltage.

The voltage regulator according to the present invention can suppress a fluctuation in output voltage even when the power supply fluctuates, by increasing the current of the error amplifier circuit. Further, the voltage regulator is configured not to respond to a small fluctuation in output voltage that is caused when the power supply voltage or the like slightly fluctuates, but to cause an excessive current to flow through the error amplifier circuit when the output voltage largely fluctuates due to a large fluctuation in power supply voltage or the like. In this manner, unstable operation of the voltage regulator can be prevented.

DETAILED DESCRIPTION OF THE PREFERRED EMBODIMENTS

Now, embodiments of the present invention are described with reference to the drawings.

First Embodiment

Figure 1:
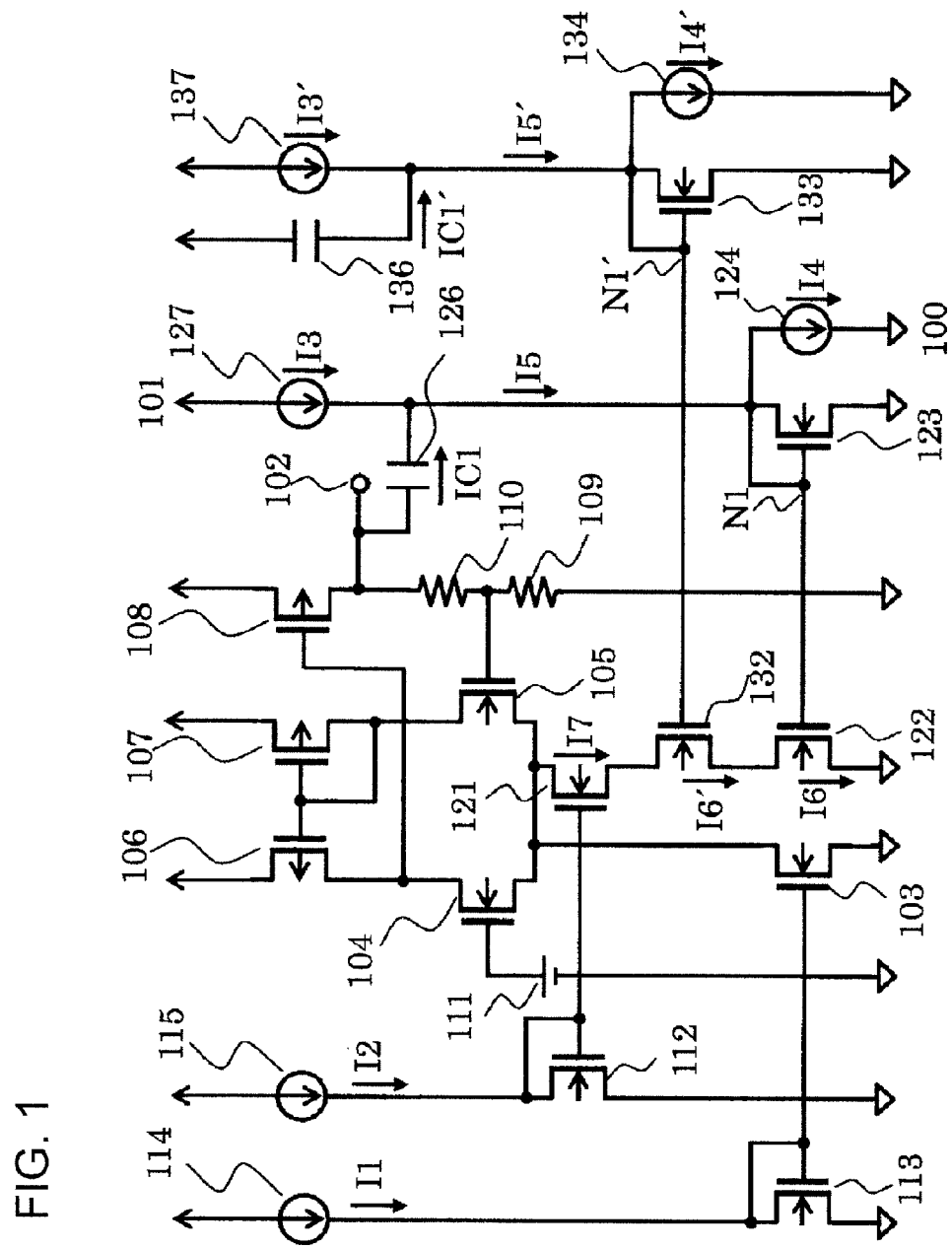
FIG. 1 is a circuit diagram for illustrating the configuration of a voltage regulator according to a first embodiment of the present invention.

FIG. 1 is a circuit diagram of a voltage regulator according to a first embodiment of the present invention.

The voltage regulator of the first embodiment includes PMOS transistors 106, 107, and 108, NMOS transistors 103, 104, 105, 112, 113, 121, 122, 123, 132, and 133, resistors 109 and 110, capacitors 126 and 136, a reference voltage circuit 111, constant current circuits 114, 115, 127, 124, 137, and 134, a ground terminal 100, a power supply terminal 101, and an output terminal 102.

The PMOS transistors 106 and 107 and the NMOS transistors 103, 104, and 105 form an error amplifier circuit. The constant current circuits 124, 127, 137, and 134, the capacitors 126 and 136, and the NMOS transistors 123, 122, 133, 132, and 121 form a control circuit. The capacitor 126 and the constant current circuits 124 and 127 form an overshoot detection circuit configured to detect overshoot of an output voltage Vout. The capacitor 136 and the constant current circuits 134 and 137 form a power supply voltage detection circuit configured to detect an increase in power supply voltage VDD.

Next, connections in the voltage regulator of the first embodiment are described. The constant current circuit 114 has one terminal connected to the power supply terminal 101, and the other terminal connected to a gate and a drain of the NMOS transistor 113. A source of the NMOS transistor 113 is connected to the ground terminal 100. The constant current circuit 115 has one terminal connected to the power supply terminal 101, and the other terminal connected to a gate and a drain of the NMOS transistor 112. A source of the NMOS transistor 112 is connected to the ground terminal 100. The NMOS transistor 103 has a gate connected to the gate and the drain of the NMOS transistor 113, a drain connected to a source of the NMOS transistor 104, and a source connected to the ground terminal 100. The NMOS transistor 121 has a gate connected to the gate and the drain of the NMOS transistor 112, a drain connected to the source of the NMOS transistor 104, and a source connected to a drain of the NMOS transistor 132. The NMOS transistor 132 has a gate connected to a gate and a drain of the NMOS transistor 133, and a source connected to a drain of the NMOS transistor 122. The NMOS transistor 122 has a gate connected to a gate and a drain of the NMOS transistor 123, and a source connected to the ground terminal 100. The NMOS transistor 123 has a drain connected to one terminal of the constant current circuit 124, and a source connected to the ground terminal 100. The other terminal of the constant current circuit 124 is connected to the ground terminal 100. The NMOS transistor 133 has the drain connected to one terminal of the constant current circuit 134, and a source connected to the ground terminal 100. The other terminal of the constant current circuit 134 is connected to the ground terminal 100. The reference voltage circuit 111 has a positive terminal connected to a gate of the NMOS transistor 104, and a negative terminal connected to the ground terminal 100. The PMOS transistor 106 has a gate connected to a gate and a drain of the PMOS transistor 107, a drain connected to a drain of the NMOS transistor 104, and a source connected to the power supply terminal 101. The PMOS transistor 107 has a source connected to the power supply terminal 101, and the drain connected to a drain of the NMOS transistor 105. The NMOS transistor 105 has a source connected to the source of the NMOS transistor 104, and a gate connected to a node between one terminal of the resistor 109 and one terminal of the resistor 110. The other terminal of the resistor 110 is connected to the output terminal 102, and the other terminal of the resistor 109 is connected to the ground terminal 100. The PMOS transistor 108 has a gate connected to the drain of the NMOS transistor 104, a drain connected to the output terminal 102, and a source connected to the power supply terminal 101. The constant current circuit 127 has one terminal connected to the power supply terminal 101, and the other terminal connected to the drain and the gate of the NMOS transistor 123. The capacitor 126 is connected between the output terminal 102 and the drain and the gate of the NMOS transistor 123. The constant current circuit 137 has one terminal connected to the power supply terminal 101, and the other terminal connected to the drain and the gate of the NMOS transistor 133. The capacitor 136 is connected between the power supply terminal 101 and the drain and the gate of the NMOS transistor 133.

Next, operation of the voltage regulator of the first embodiment is described. When a power supply voltage VDD is input to the power supply terminal 101, the voltage regulator outputs the output voltage Vout from the output terminal 102. The output voltage Vout is divided by the resistors 109 and 110 to be output as a divided voltage Vfb. The error amplifier circuit compares the divided voltage Vfb and a reference voltage Vref of the reference voltage circuit 111 to each other, and controls a gate voltage of the PMOS transistor 108 (output transistor) so that the output voltage Vout may be constant. Currents flowing through the constant current circuits 114, 115, 127, 124, 137, and 134 are represented by I1, I2, I3, I4, I3', and I4', respectively. In a steady state, the current values are set in accordance with the relationships of I3<I4 and I3'<I4', and hence gate voltages of the NMOS transistors 122 and 132 are clamped to a ground voltage and no current flows therethrough.

When the output voltage Vout is higher than a predetermined value, the divided voltage Vfb is higher than the reference voltage Vref. Thus, an output signal of the error amplifier circuit is increased to turn off the PMOS transistor 108, thereby decreasing the output voltage Vout. On the other hand, when the output voltage Vout is lower than the predetermined value, the reverse operation of the one described above is performed, thereby increasing the output voltage Vout. The voltage regulator is configured to operate to control the output voltage Vout to be constant in this way.

A case where the power supply voltage VDD fluctuates is now considered. The gate of the NMOS transistor 123 is referred to as a node N1. A current flowing from a node between the capacitor 126 and the constant current circuit 127 to a node between the drain of the NMOS transistor 123 and the constant current circuit 124 is represented by I5. A current flowing through the NMOS transistor 122 is represented by I6. The gate of the NMOS transistor 133 is referred to as a node N1'. A current flowing from a node between the capacitor 136 and the constant current circuit 137 to a node between the drain of the NMOS transistor 133 and the constant current circuit 134 is represented by I5'. A current flowing through the NMOS transistor 132 is represented by I6', and a current flowing through the NMOS transistor 121 is represented by I7.

When the power supply voltage VDD largely increases, overshoot occurs in the output voltage Vout. Then, a current IC1 flows from the output terminal 102 (output voltage Vout) through the capacitor 126. The current I5 has the relationship of I5=I3+IC1. When the current IC1 is increased and the relationship of I5>I4 holds, a voltage of the node N1 is increased to cause a boost current I6 to flow through the NMOS transistor 122. Further, a current IC1' flows from the power supply terminal 101 (power supply voltage VDD) through the capacitor 136. The current I5' has the relationship of I5'=I3'+IC1'. When the current IC1' is increased and I5'>I4' holds, a voltage of the node N1' is increased to cause a boost current I6' to flow through the NMOS transistor 132. In this case, one of the currents I6 and I6' that is smaller than the other flows through the error amplifier circuit. In this way, a current of the error amplifier circuit is increased to improve the circuit's transient response, and the overshoot occurring in the output voltage Vout is suppressed.

The boost current I6 does not flow until the relationship of IC1>I4−I3 holds, and the boost current I6' does not flow until the relationship of IC1'>I4'−I3' holds. Hence, the voltage regulator does not respond to a small fluctuation in output voltage Vout that is caused when the power supply voltage VDD slightly fluctuates, which means that the voltage regulator can stably operate. Further, the voltage regulator does not respond to a fluctuation in only output voltage Vout that is caused while the power supply voltage VDD does not fluctuate, which means that the voltage regulator can stably operate. Further, the maximum values of the boost currents I6 and I6' are limited by the current I7. Thus, even when the output voltage Vout largely fluctuates, the boost currents I6 and I6' larger than the current I7 do not flow, that is, the tail current of the error amplifier circuit is not excessively increased. This means that the voltage regulator can stably operate.

The boost currents I6 and I6' can be caused to flow in a similar manner even when the NMOS transistors 123 and 133 are omitted. Further, when the NMOS transistors 122 and 123, the constant current circuits 127 and 124, and the capacitor 126 are omitted (the source of the NMOS transistor 132 is connected to the ground terminal 100), the boost current I6' can be caused to flow when the power supply voltage VDD fluctuates.

As described above, the voltage regulator of the first embodiment can suppress overshoot of the output voltage Vout by increasing the current of the error amplifier circuit. Further, the voltage regulator is configured not to respond to a small fluctuation in output voltage Vout that is caused when the power supply voltage or the like slightly fluctuates, but to prevent the tail current from excessively flowing through the error amplifier circuit when the output voltage Vout largely fluctuates due to a large fluctuation in power supply voltage or the like. This means that the voltage regulator can stably operate.

Second Embodiment

Figure 2:
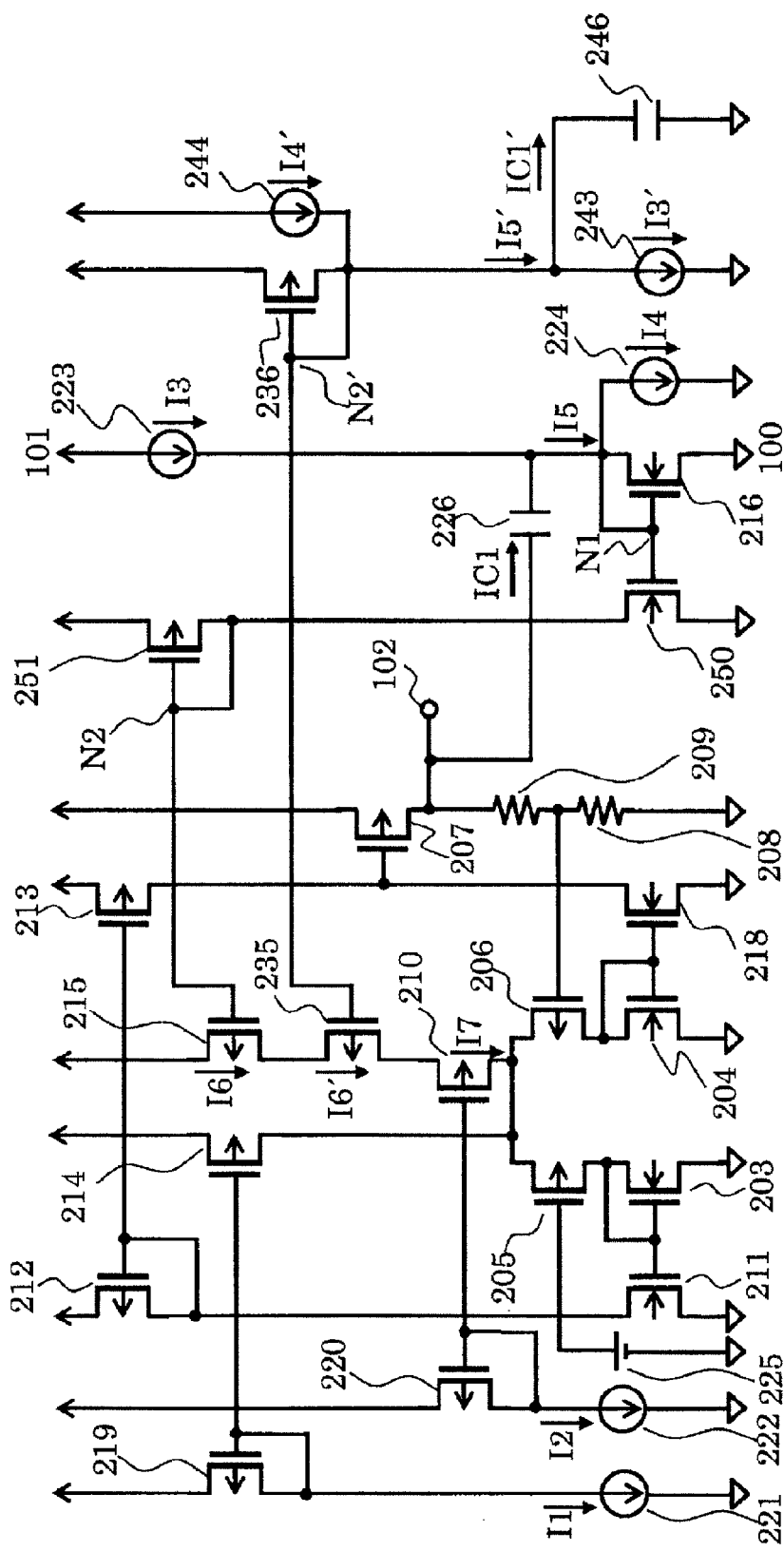
FIG. 2 is a circuit diagram for illustrating the configuration of a voltage regulator according to a second embodiment of the present invention.
Figure 3:
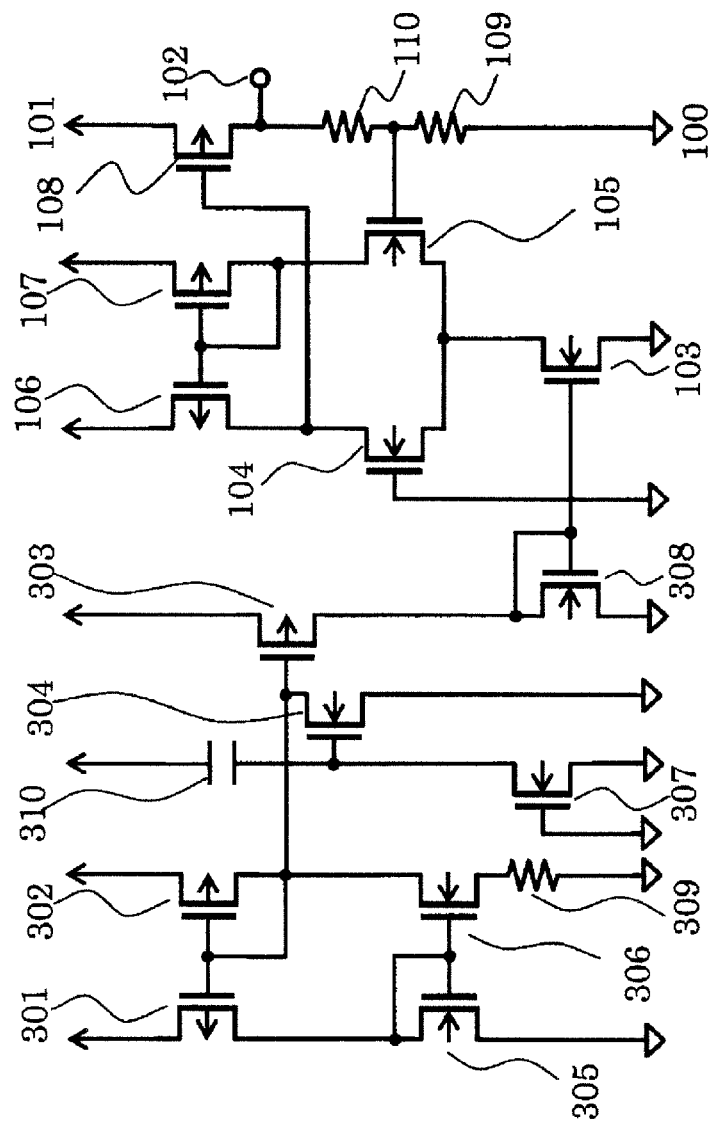
FIG. 3 is a circuit diagram for illustrating the configuration of a related-art voltage regulator.

FIG. 2 is a circuit diagram of a voltage regulator according to a second embodiment of the present invention.

The voltage regulator of the second embodiment includes PMOS transistors 205, 206, 207, 210, 212, 213, 214, 215, 219, 220, 235, 236, and 251, NMOS transistors 203, 204, 211, 216, 218, and 250, resistors 208 and 209, capacitors 226 and 246, a reference voltage circuit 225, constant current circuits 221, 222, 223, 224, 243, and 244, a ground terminal 100, a power supply terminal 101, and an output terminal 102. The PMOS transistors 205, 206, 212, 213, and 214 and the NMOS transistors 203, 204, 211, and 218 form an error amplifier circuit. The constant current circuits 224, 223, 244, and 243, the capacitors 226 and 246, the PMOS transistors 210, 215, 235, 236, and 251, and the NMOS transistors 216 and 250 form a control circuit. The capacitor 226 and the constant current circuits 223 and 224 form an overshoot detection circuit configured to detect overshoot of an output voltage Vout. The capacitor 246 and the constant current circuits 243 and 244 form a power supply voltage detection circuit configured to detect an increase in power supply voltage VDD.

Next, connections in the voltage regulator of the second embodiment are described. The constant current circuit 221 has one terminal connected to a gate and a drain of the PMOS transistor 219, and the other terminal connected to the ground terminal 100. The PMOS transistor 219 has a source connected to the power supply terminal 101, and the gate connected to a gate of the PMOS transistor 214. The PMOS transistor 214 has a source connected to the power supply terminal 101, and a drain connected to a source of the PMOS transistor 205. The constant current circuit 222 has one terminal connected to a gate and a drain of the PMOS transistor 220, and the other terminal connected to the ground terminal 100. The PMOS transistor 220 has a source connected to the power supply terminal 101, and the gate connected to a gate of the PMOS transistor 210. The PMOS transistor 210 has a source connected to a drain of the PMOS transistor 235, and a drain connected to the source of the PMOS transistor 205. The PMOS transistor 235 has a gate connected to a gate and a drain of the PMOS transistor 236, and a source connected to a drain of the PMOS transistor 215. The PMOS transistor 215 has a gate connected to a gate and a drain of the PMOS transistor 251, and a source connected to the power supply terminal 101. A source of the PMOS transistor 251 is connected to the power supply terminal 101. The NMOS transistor 250 has a drain connected to a gate and a drain of the PMOS transistor 251, and a source connected to the ground terminal 100. The reference voltage circuit 225 has a positive terminal connected to a gate of the PMOS transistor 205, and a negative terminal connected to the ground terminal 100. The NMOS transistor 203 has a gate and a drain both connected to a drain of the PMOS transistor 205, and a source connected to the ground terminal 100. The NMOS transistor 211 has a gate connected to the gate and the drain of the NMOS transistor 203, a drain connected to a gate and a drain of the PMOS transistor 212, and a source connected to the ground terminal 100. The PMOS transistor 212 has the gate connected to a gate of the PMOS transistor 213, and a source connected to the power supply terminal 101. The PMOS transistor 213 has a drain connected to a drain of the NMOS transistor 218, and a source connected to the power supply terminal 101. The NMOS transistor 218 has a gate connected to a gate and a drain of the NMOS transistor 204, and a source connected to the ground terminal 100. The PMOS transistor 206 has a drain connected to the gate and the drain of the NMOS transistor 204, a gate connected to a node between one terminal of the resistor 208 and one terminal of the resistor 209, and a source connected to the source of the PMOS transistor 205. The other terminal of the resistor 209 is connected to the output terminal 102, and the other terminal of the resistor 208 is connected to the ground terminal 100. A source of the NMOS transistor 204 is connected to the ground terminal 100. The PMOS transistor 207 has a gate connected to the drain of the PMOS transistor 213, a drain connected to the output terminal 102, and a source connected to the power supply terminal 101. The constant current circuit 224 has one terminal connected to the ground terminal 100, and the other terminal connected to a gate and a drain of the NMOS transistor 216. The NMOS transistor 216 has the gate connected to a gate of the NMOS transistor 250, and a source connected to the ground terminal 100. The constant current circuit 223 has one terminal connected to the gate and the drain of the NMOS transistor 216, and the other terminal connected to the power supply terminal 101. The capacitor 226 has one terminal connected to the output terminal 102, and the other terminal connected to a node between the constant current circuit 223 and the constant current circuit 224. The constant current circuit 244 has one terminal connected to the power supply terminal 101, and the other terminal connected to the gate and the drain of the PMOS transistor 236. A source of the PMOS transistor 236 is connected to the power supply terminal 101. The constant current circuit 243 has one terminal connected to the gate and the drain of the PMOS transistor 236, and the other terminal connected to the ground terminal 100. The capacitor 246 has one terminal connected to the ground terminal 100, and the other terminal connected to a node between the constant current circuit 243 and the constant current circuit 244.

Next, operation of the voltage regulator of the second embodiment is described. When a power supply voltage VDD is input to the power supply terminal 101, the voltage regulator outputs the output voltage Vout from the output terminal 102. The output voltage Vout is divided by the resistors 208 and 209 to be output as a divided voltage Vfb. The error amplifier circuit compares the divided voltage Vfb and a reference voltage Vref of the reference voltage circuit 225 to each other, and controls a gate voltage of the PMOS transistor 207 configured to operate as an output transistor so that the output voltage Vout may be constant. Currents flowing through the constant current circuits 221, 222, 223, 224, 243, and 244 are represented by I1, I2, I3, I4, I3', and I4', respectively. In the steady state, the current values are set in accordance with the relationships of I3<I4 and I3'<I4'. Thus, gate voltages of the PMOS transistors 215 and 235 are clamped to the power supply voltage VDD and no current flows through the PMOS transistors 215 and 235.

When the output voltage Vout is higher than a predetermined value, the divided voltage Vfb is higher than the reference voltage Vref. Thus, an output signal of the error amplifier circuit is increased to turn off the PMOS transistor 207, thereby decreasing the output voltage Vout. On the other hand, when the output voltage Vout is lower than the predetermined value, the reverse operation of the one described above is performed, thereby increasing the output voltage Vout. The voltage regulator is configured to operate to control the output voltage Vout to be constant in this way.

A case where the power supply voltage VDD fluctuates is now considered. The gate of the NMOS transistor 216 is referred to as a node N1. The gate of the PMOS transistor 251 is referred to as a node N2. A current flowing from a node between the capacitor 226 and the constant current circuit 223 to a node between the drain of the NMOS transistor 216 and the constant current circuit 224 is represented by I5. A current flowing through the PMOS transistor 215 is represented by I6. The gate of the PMOS transistor 236 is referred to as a node N2'. A current flowing from a node between the drain of the PMOS transistor 236 and the constant current circuit 244 to a node between the capacitor 246 and the constant current circuit 243 is represented by I5'. A current flowing through the PMOS transistor 235 is represented by I6', and a current flowing through the PMOS transistor 210 is represented by I7.

When the power supply voltage VDD largely increases, overshoot occurs in the output voltage Vout. Then, a current IC1 flows from the output terminal 102 (output voltage Vout) through the capacitor 226. The current I5 has the relationship of I5=I3+IC1. When the current IC1 is increased and the relationship of I5>I4 holds, a voltage of the node N1 is increased to turn on the NMOS transistor 250. Thus, a voltage of the node N2 is decreased, and the boost current I6 flows through the PMOS transistor 215. Further, when the power supply voltage VDD is largely increased, the current IC1' flows through the capacitor 246. The current I5' has the relationship of I5'=I3'+IC1'. When the current IC1' is increased and I5'>I4' holds, a voltage of the node N2' is decreased to cause a boost current I6' to flow through the NMOS transistor 235. In this case, one of the currents I6 and I6' that is smaller than the other flows through the error amplifier circuit. In this way, a current of the error amplifier circuit is increased to improve the circuit's transient response, and the overshoot occurring in the output voltage Vout is suppressed.

The boost current I6 does not flow until the relationship of IC1>I4−I3 holds, and the boost current I6' does not flow until the relationship of IC1'>I4'−I3' holds. Hence, the voltage regulator does not respond to a small fluctuation in output voltage Vout that is caused when the power supply voltage VDD slightly fluctuates, which means that the voltage regulator can stably operate. Further, the voltage regulator does not respond to a fluctuation in only output voltage Vout that is caused while the power supply voltage VDD does not fluctuate, which means that the voltage regulator can stably operate. Further, the maximum values of the boost currents I6 and I6' are limited by the current I7. Thus, even when the output voltage Vout largely fluctuates, the boost currents I6 and I6' larger than the current I7 do not flow, that is, the tail current of the error amplifier circuit is not excessively increased. This means that the voltage regulator can stably operate.

The boost currents I6 and I6' can be caused to flow in a similar manner even when the NMOS transistors 216 and 236 are omitted. Further, when the NMOS transistors 216 and 250, the PMOS transistors 251 and 215, the constant current circuits 223 and 224, and the capacitor 226 are omitted, the boost current I6' can be caused to flow when the power supply voltage VDD fluctuates.

As described above, the voltage regulator of the second embodiment can suppress overshoot of the output voltage Vout by increasing the current of the error amplifier circuit. Further, the voltage regulator is configured not to respond to a small fluctuation in output voltage Vout that is caused when the power supply voltage or the like slightly fluctuates, but to prevent the tail current from excessively flowing through the error amplifier circuit when the output voltage Vout largely fluctuates due to a large fluctuation in power supply voltage or the like. This means that the voltage regulator can stably operate.

The voltage regulator of the second embodiment is configured to cause the boost current I6' to flow, when the power supply voltage VDD fluctuates, through use of the PMOS transistor 236, the capacitor 246, and the constant current circuits 243 and 244. However, such a configuration may be employed that a current is returned through the NMOS transistor 133, the capacitor 136, the constant current circuits 134 and 137, and a current mirror circuit, as in the configuration of FIG. 1.

What is claimed is:
1. A voltage regulator configured to stabilize a power supply voltage input from a power supply terminal to output the stabilized power supply voltage, the voltage regulator comprising:
    an error amplifier circuit configured to amplify a difference between a reference voltage and a divided voltage obtained by dividing an output voltage output from an output transistor to output the amplified difference, to thereby control a gate of the output transistor; and
    a control circuit comprising:
        a first input terminal connected to a drain of the output transistor,
        a second input terminal connected to the power supply terminal,
        an overshoot detection circuit connected to the first input terminal, and a power supply voltage detection circuit connected to the second input terminal, and being configured to cause a boost current to flow through the error amplifier circuit when the power supply voltage increases with respect to a predetermined threshold voltage and the overshoot detection circuit detects overshoot in the output voltage.

2. A voltage regulator configured to stabilize a power supply voltage input from a power supply terminal to output the stabilized power supply voltage, the voltage regulator comprising:
   an error amplifier circuit configured to amplify a difference between a reference voltage and a divided voltage obtained by dividing an output voltage output from an output transistor to output the amplified difference, to thereby control a gate of the output transistor; and
   a control circuit comprising:
      a first input terminal connected to a drain of the output transistor,
      a second input terminal connected to the power supply terminal,
      an overshoot detection circuit connected to the first input terminal, and
      a power supply voltage detection circuit connected to the second input terminal, and being configured to cause a boost current to flow through the error amplifier circuit when both the output voltage and the power supply voltage fluctuate with respect to a predetermined threshold voltage;
   wherein the overshoot detection circuit comprises:
      a first constant current circuit and a second constant current circuit connected in series between the power supply terminal and a ground terminal; and
      a first capacitive element including one terminal connected to the first input terminal, and another terminal connected to a node between the first constant current circuit and the second constant current circuit, and
   wherein the power supply voltage detection circuit comprises:
      a third constant current circuit and a fourth constant current circuit connected in series between the power supply terminal and the ground terminal; and
      a second capacitive element connected in parallel to the fourth constant current circuit.

3. A voltage regulator according to claim 2,
wherein a current flowing from the first constant current circuit is larger than a current flowing from the second constant current circuit, and
wherein a current flowing from the third constant current circuit is larger than a current flowing from the fourth constant current circuit.

4. A voltage regulator according to claim 3,
wherein the control circuit comprises:
   a first transistor configured to cause a current to flow when a sum of the current flowing from the second constant current circuit and a current flowing from the first capacitive element is larger than the current flowing from the first constant current circuit;
   a second transistor configured to cause a current to flow when a sum of the current flowing from the fourth constant current circuit and a current flowing from the second capacitive element is larger than the current flowing from the third constant current circuit;
   a third transistor configured to cause a boost current to flow through the error amplifier circuit based on the current flowing from the first transistor; and
   a fourth transistor configured to cause a boost current to flow through the error amplifier circuit based on the current flowing from the second transistor, and
wherein the third transistor and the fourth transistor are connected in series.

5. A voltage regulator according to claim 4, wherein the control circuit further comprises a fifth transistor configured to limit the boost current of the error amplifier circuit to a predetermined value or less.

* * * * *